(12) United States Patent
Zirkler

(10) Patent No.: US 10,715,351 B2
(45) Date of Patent: Jul. 14, 2020

(54) NETWORK NODE, CONTROL MODULE FOR A COMPONENT AND ETHERNET RING

(71) Applicant: SIEMENS AKTIENGESELLSCHAFT, München (DE)

(72) Inventor: Andreas Zirkler, München (DE)

(73) Assignee: Siemens Aktiengesellschaft, München (DE)

( * ) Notice: Subject to any disclaimer, the term of this patent is extended or adjusted under 35 U.S.C. 154(b) by 229 days.

(21) Appl. No.: 15/512,554

(22) PCT Filed: Aug. 19, 2015

(86) PCT No.: PCT/EP2015/068992
§ 371 (c)(1),
(2) Date: Mar. 18, 2017

(87) PCT Pub. No.: WO2016/041720
PCT Pub. Date: Mar. 24, 2016

(65) Prior Publication Data
US 2017/0222831 A1  Aug. 3, 2017

(30) Foreign Application Priority Data
Sep. 18, 2014 (DE) .................. 10 2014 218 823

(51) Int. Cl.
*G06F 15/16* (2006.01)
*H04L 12/437* (2006.01)
(Continued)

(52) U.S. Cl.
CPC ........ *H04L 12/437* (2013.01); *G06F 11/2028* (2013.01); *H04L 12/433* (2013.01);
(Continued)

(58) Field of Classification Search
CPC ............... H04L 29/08072; H04L 29/06; H04L 67/2838; H04L 63/029
(Continued)

(56) References Cited

U.S. PATENT DOCUMENTS 6,233,702 B1   5/2001 Horst et al.
6,838,686 B2 * 1/2005 Kataoka ................ G03F 9/7003
                                              250/492.22
(Continued)

FOREIGN PATENT DOCUMENTS

CN      1910856 A    2/2007
CN    102301627 A   12/2011
(Continued)

OTHER PUBLICATIONS

German Search Report for related German Application No. 10 2014 218 823.7 dated Apr. 27, 2015, with English Translation.
(Continued)

*Primary Examiner* — Khanh Q Dinh
(74) *Attorney, Agent, or Firm* — Lempia Summerfield Katz LLC

(57) ABSTRACT

The invention relates to network nodes comprising: a first computing unit ($CPU_a$); at least one second computing unit ($CPU_b$); an internal switch ($Sw_i$); and an external switch ($Sw_e$), wherein the internal switch ($Sw_i$) is connected to the first computing Nunit ($CPU_a$), the at least second computing unit ($CPU_b$) and to the external switch ($Sw_e$) and wherein the external switch ($Sw_e$) has at least one port for data originating from other network nodes. The invention also relates to a control module and an Ethernet ring.

16 Claims, 2 Drawing Sheets

(51) Int. Cl.
*H04L 12/433* (2006.01)
*G06F 11/20* (2006.01)
*H04L 12/707* (2013.01)
*H04L 12/703* (2013.01)
*G06F 11/16* (2006.01)
*G06F 11/07* (2006.01)
*H04L 29/08* (2006.01)

(52) U.S. Cl.
CPC .............. *H04L 45/22* (2013.01); *H04L 45/28* (2013.01); *G06F 11/0796* (2013.01); *G06F 11/1633* (2013.01); *H04L 67/12* (2013.01); *H04L 67/2838* (2013.01)

(58) Field of Classification Search
USPC ........................................ 709/220, 224, 228
See application file for complete search history.

(56) References Cited

U.S. PATENT DOCUMENTS

| | | | | |
|---|---|---|---|---|
| 7,107,337 | B2* | 9/2006 | Barrow | G06F 13/38 709/200 |
| 7,447,197 | B2* | 11/2008 | Terrell | H04L 67/1097 370/360 |
| 7,792,046 | B2* | 9/2010 | Kucharczyk | H04L 12/4645 370/244 |
| 8,874,274 | B2* | 10/2014 | McDonald | H04L 12/403 62/55.5 |
| 9,148,346 | B2* | 9/2015 | Singh | H04L 41/12 |
| 9,241,044 | B2* | 1/2016 | Shribman | H04L 67/2838 |
| 9,338,060 | B2* | 5/2016 | Singh | H04L 41/12 |
| 9,680,735 | B2* | 6/2017 | Armbruster | H04L 12/40163 |
| 9,998,385 | B2* | 6/2018 | Armbruster | H04L 49/55 |
| 2009/0077258 | A1* | 3/2009 | Dowling | G06Q 20/04 709/237 |
| 2011/0051723 | A1 | 3/2011 | Rabie | |
| 2012/0033968 | A1 | 2/2012 | Testa | |
| 2012/0236726 | A1* | 9/2012 | Shihada | H04L 43/0852 370/237 |
| 2014/0140209 | A1* | 5/2014 | Shihada | H04L 43/0864 370/230 |
| 2014/0328171 | A1* | 11/2014 | Armbruster | H04L 49/55 370/230 |
| 2014/0376561 | A1 | 12/2014 | Armbruster et al. | |
| 2015/0006701 | A1* | 1/2015 | Armbruster | H04L 12/40163 709/223 |
| 2015/0138954 | A1 | 5/2015 | Ross | |

FOREIGN PATENT DOCUMENTS

| | | |
|---|---|---|
| CN | 104025514 A | 9/2014 |
| DE | 102011082969 A1 | 3/2013 |
| DE | 102012000188 A1 | 7/2013 |
| WO | WO2013104436 A1 | 7/2013 |
| WO | WO2013186154 A1 | 12/2013 |

OTHER PUBLICATIONS

PCT International Search Report and Written Opinion of the International Searching Authority dated Nov. 6, 2015 for corresponding PCT/EP2015/068992, with English Translation.
Chinese Office Action for Chinese Application No. 201580050592.0 dated Jun. 5, 2019.

* cited by examiner

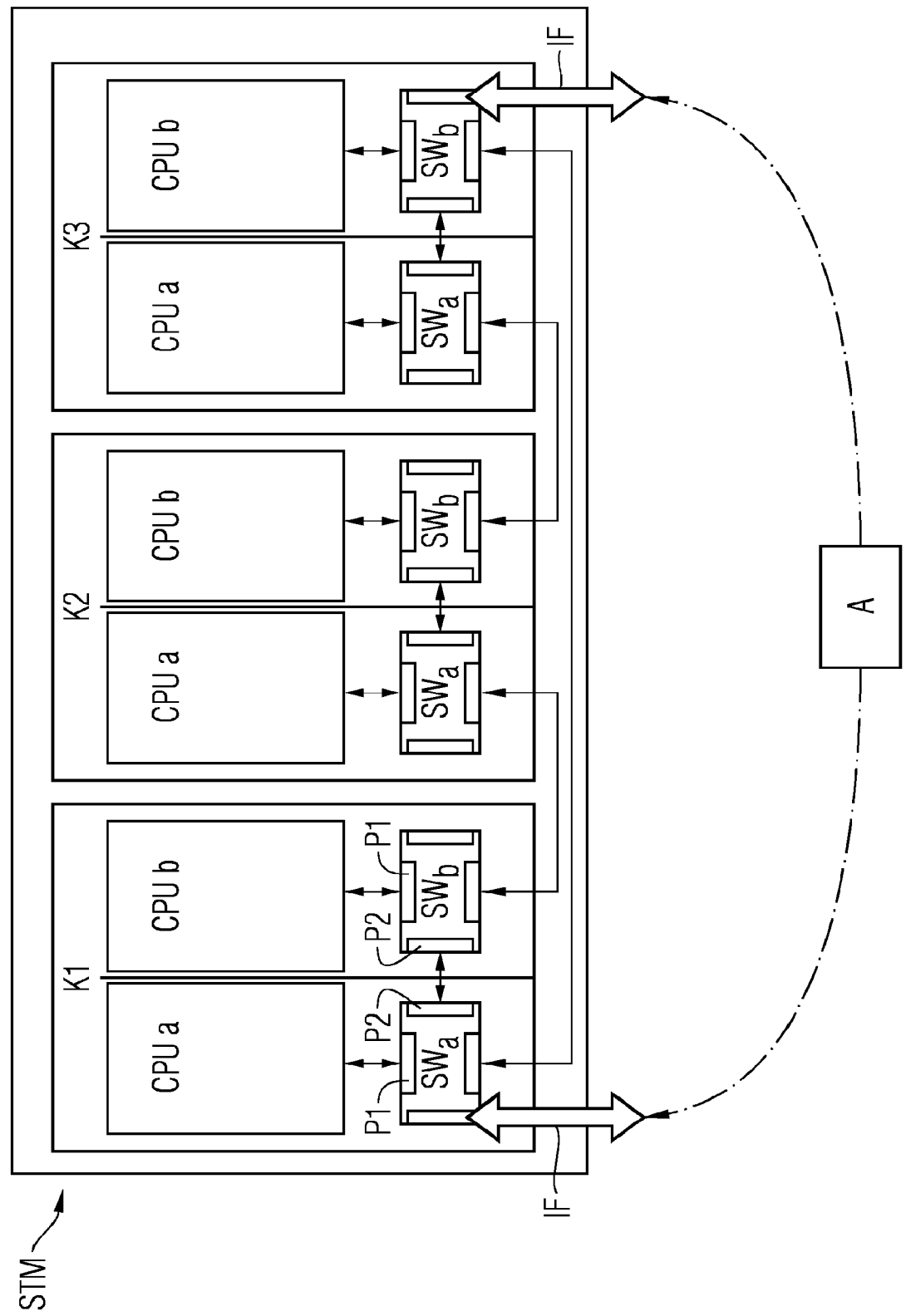

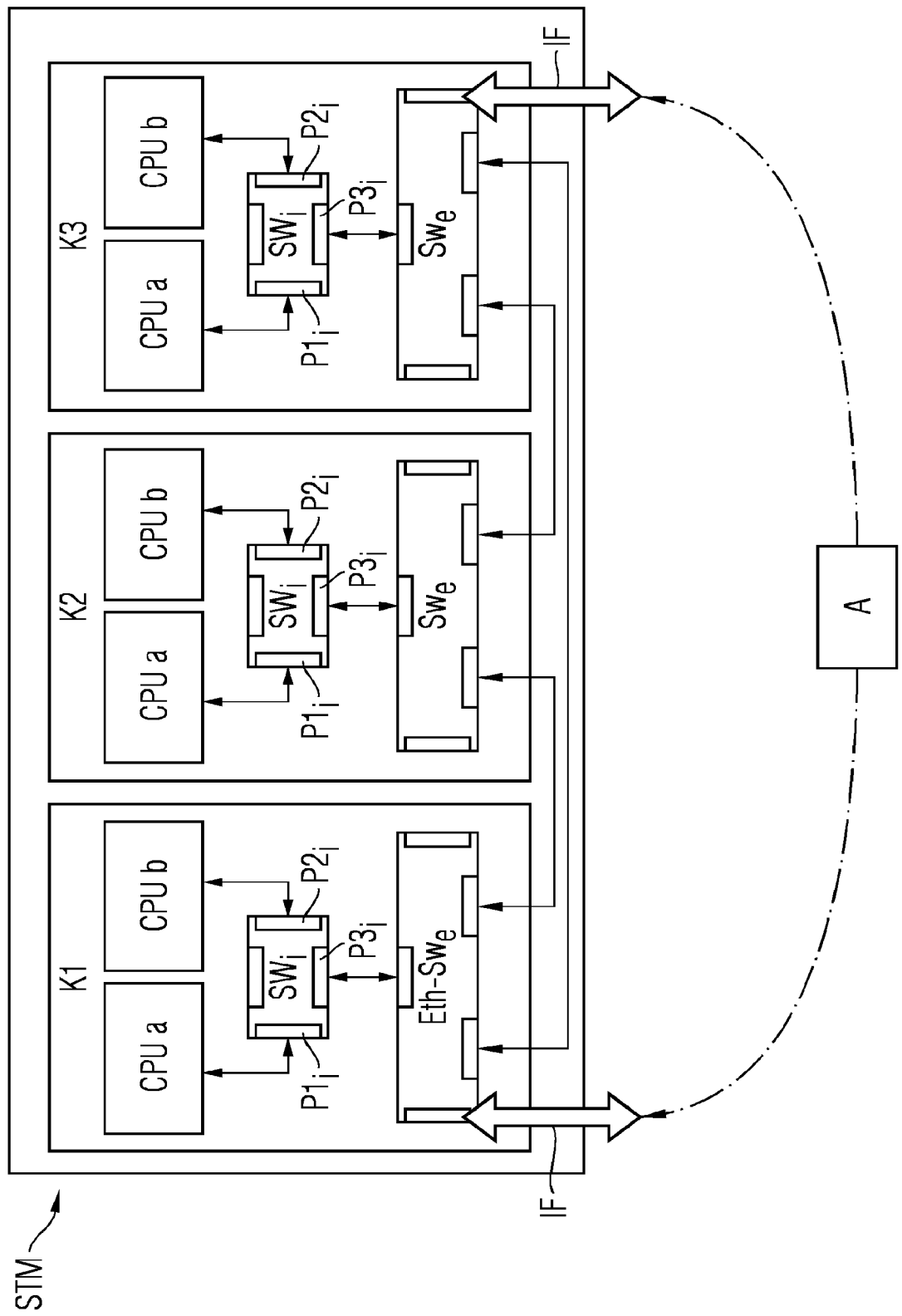

NETWORK NODE, CONTROL MODULE FOR A COMPONENT AND ETHERNET RING

This application is the National Stage of International Application No. PCT/EP2015/068992, filed Aug. 19, 2015, which claims the benefit of German Patent Application No. 10 2014 218 823.7, filed Sep. 18, 2014. The entire contents of these documents are hereby incorporated herein by reference.

BACKGROUND

The present embodiments relate to a network node, to a control module for a component, and to an Ethernet ring.

Redundant systems having a "fail operational" behavior, for example, are very important (e.g., in connection with autonomous driving). Autonomous driving comes into consideration for electric vehicles, for internal combustion engine vehicles, and for hybrid vehicles as well as for special vehicles (e.g., forklift trucks in production halls). Fly-by-wire systems and autopilots are already used in aviation, but the systems used in aviation are too expensive for use in automobiles.

Redundant systems are also used in other areas (e.g., in the control of industrial installations, power plants, railroad crossings, etc.). For reasons of cost, a system is often not made "fail operational" if a safe state may be assumed and a "fail silent" behavior is therefore sufficient. A railroad crossing would close in the event of a fault, for example. The railroad crossing system would be safe in this example, but would no longer function.

In the event of any individual fault, "fail operational" systems are able to detect and isolate this fault and are still able to function, at least for a particular time. This time may be used to safely approach the next parking lot (e.g., in the automobile) or to repair the components that have failed and therefore provide interruption-free operation in an industrial installation.

Fail operational systems are to be used if there is no safe state (e.g., if a vehicle cannot easily stop on the highway). Fail operational systems may be used to increase the availability of a system. In this case, the costs for the fail operational configuration are to be compared with the costs for a possible failure.

SUMMARY AND DESCRIPTION

The scope of the present invention is defined solely by the appended claims and is not affected to any degree by the statements within this summary.

The present embodiments may obviate one or more of the drawbacks or limitations in the related art. For example, a possible way of providing high failure safety (e.g., in fail operational systems) at low costs is provided.

A corresponding network node has a first computing unit and at least one second computing unit. An internal switch and an external switch are also provided. The internal switch is connected to the first computing unit and to the at least second computing unit. The internal switch is also connected to the external switch. The external switch has at least one port for data that comes from other network nodes.

The present embodiments also relate to a control module for controlling an assembly and to an Ethernet ring.

BRIEF DESCRIPTION OF THE DRAWINGS

FIG. 1 shows a configuration of a control module according to the prior art; and FIG. 2 shows an exemplary embodiment of a control module.

DETAILED DESCRIPTION

FIG. 1 depicts one embodiment of a control module STM having a plurality of network nodes (e.g., the network nodes or nodes 1, K1, nodes 2, K2 and nodes 3, K3). Each of the nodes K1, K2, K3 is in the form of a duplex control computer (DCC). In other words, the node K1, for example, has a first central computing unit (CPU) $CPU_a$ having an associated switch $Sw_a$ and a second central computing unit $CPU_b$ and an associated switch $Sw_b$. The two other nodes illustrated, the second node K2 and the third node K3, are configured accordingly. The control module STM also has at least one interface IF for making it possible to communicate with at least one component or assembly to be controlled.

The control module STM including the three nodes K1, K2 and K3 is intended to be "fail operational." In other words, in the event of the defective function of at least one computing unit in one of the nodes, another node is intended to be able to undertake this task. If, for example, the computing unit $CPU_a$ in the node K1 fails or operates defectively, one of the two other nodes K2 or K3 is intended to be able to undertake this task.

The determination regarding whether a node is operating defectively is made as stated below: the aim is for the control module STM to output a correct control command for an assembly (e.g., a sensor or an actuator) via the interface IF. For this purpose, the first computing unit $CPU_a$ and the second computing unit $CPU_b$ in the node that is primarily assigned this task calculate the necessary operations. A separate calculation is therefore carried out. The data that has been calculated in the first computing unit $CPU_a$ is transmitted to a switch $Sw_a$ assigned to this computing unit (e.g., transferred to the switch $Sw_a$ via a first port P1).

The second computing unit $CPU_b$ in the node K1 likewise calculates the data required for the respective control command and passes the data to the associated second switch $Sw_b$ via the port P1 of the switch. The data may be interchanged between the two computing units $CPU_a$ and $CPU_b$ and may be consolidated via a further port P2 on the switch $Sw_b$ assigned to the second computing unit $CPU_b$ and on the switch $Sw_a$ assigned to the first computing unit $CPU_a$. If it is now determined that the results differ from one another, at least one of the two computing units $CPU_a$ or $CPU_b$ or one of the two switches $Sw_a$ or $Sw_b$ has not operated correctly. In order to exclude a malfunction, the entire first node K1 is therefore switched off, and one of the two other nodes (e.g., the second node K2 or the third node K3) undertakes the tasks of the first node K1. The first node K1 therefore operates according to the "fail silent" principle (e.g., this node independently switches off as soon as an incorrect method of operation is suspected).

FIG. 2 schematically illustrates an exemplary configuration of the in which the control module STM for an assembly has three nodes, a first node K1, a second node K2 and a third node K3. Alternatively, a different number of nodes≥2 may be provided.

The assembly may be a sensor, an actuator, or a combination of the two. Some examples of sensors and actuators are cited below in a non-conclusive manner. Examples of sensors are steering angle sensors, wheel speed sensors, acceleration sensors, or complex radar-based, lidar-based, camera-based, or ultrasound-based environmental sensors in vehicles, train proximity sensors at the railroad crossing, or pressure, temperature, and flow sensors in industrial installations. Actuators in the vehicle are, for example, steering angle actuators, brake force actuators, or drive motors. In industrial installations, actuators may be formed by valves, drives, pumps, and, at a railroad crossing, by the barriers.

For a control command that is transmitted to an assembly via an interface IF, the calculation is again carried out using the first computing unit $CPU_a$ and the second computing unit $CPU_b$. These computing units $CPU_a$ and $CPU_b$ forward the determined result to an internal switch $Sw_i$. In the implementation shown in FIG. 2, the $CPU_a$ is connected to the internal switch $Sw_i$ via a first port $P1_i$, and the $CPU_b$ is connected via a second port $P2_i$. A connection between the internal switch $Sw_i$ and an external switch $Sw_e$ may be established via a third port $P3_i$.

A port may be in the form of an input/output, for example. A port may be, for example, an interface of a network component, such as a switch that may be addressed via a port address, for example. Alternatively, a port may only be in the form of an input or an output.

Only packets that are directed from one computing unit to the respective other computing unit inside a node, the "X-lane traffic", or else packets that come from the first node K1 (e.g., the latter is the data source) or are directed to the first node as the destination (e.g., the first node is the data sink) pass via the internal switch $Sw_i$.

In the first case, this is carried out solely via the first port $P1_i$ and the second port $P2_i$. In the second case, the data packets are forwarded from the external switch $Sw_e$ to the internal switch $Sw_i$ and from the internal switch $Sw_i$ to the external switch $Sw_e$ via the port $P3_i$.

Data packets that are only forwarded do not reach the internal switch $Sw_i$.

If a difference is now determined, the relevant node, in which a difference in the results from the two computing units inside the node has been detected, switches off again.

For this reason, an attempt is made to avoid data packets that come from the outside being able to interfere with the communication between the computing unit $CPU_a$ and the computing unit $CPU_b$. If this were to happen, for example, because a defective node or a defective assembly sends a large volume of data with incorrect header attributes, this one defective node may result in a plurality of duplex control computers DCC switching off. A fail operational behavior would then no longer exist in this case.

Data packets that are forwarded only from one node run via the external switch $Sw_e$. The external switch $Sw_e$ has ports or inputs/outputs in order to make it possible to communicate with further nodes in the network. Optionally, the node has an interface IF in order to make it possible to communicate with at least one assembly. This interface IF may be implemented, for example, via a port of the external switch $Sw_e$.

The advantages of the proposed architecture lie in the following points. If a data packet is forwarded from one node to the other node (e.g., from the first node K1 to the third node K3), two transmissions or hops are to take place inside each node (e.g., from the switch $Sw_a$ assigned to the first computing unit to the switch $Sw_b$ assigned to the second computing unit) before the data packet is forwarded to the next node. This enhancement has negative effects on the failure probability because an error may occur during each transmission and on a time delay that occurs during the transmission. If the assembly to be controlled is also equipped with a duplex control computer DCC, this disadvantage is multiplied by the number of assemblies since two transmissions or hops also respectively take place in the duplex control computer DCC of the assembly.

In the configuration shown in FIG. 2, the two switches $Sw_{a,b}$ are each assigned to a computing unit $CPU_{a,b}$. This makes it possible to construct a node from two identical "lane modules" each including, inter alia, a computing unit and a switch. Different paths for the data to be calculated through the node, through two computing units in the configuration shown, are provided, for example, in a "lane module" or "path module." An embodiment having identical lane modules is advantageous, for example, in the case of smaller quantities since the development costs for a node may be kept low since only one lane module is to be developed.

In another configuration, the switch $Sw_a$ assigned to the computing unit $CPU_a$ and the switch $Sw_b$ assigned to the computing unit $CPU_b$ are functionally in the form of a switch that is assigned to both computing units. In this case, the port $P2_i$ would be dispensed with or would be replaced with an internal connection in the switch. For larger quantities, the implementation with only one switch would be advantageous. Lower unit costs would offset the higher development costs for the more complicated circuit board and the more complex switch equipped with more ports.

In contrast, in another configuration, data packets that do not come from a data node and are not directed to the latter as the destination are forwarded only via the external switch $Sw_e$. This results in only one hop for forwarded data packets occurring inside a node.

In addition to the advantage described above in the alternative implementation having a single switch, this also has the advantage that there is no need to use a complex switch that is possibly not available in a suitable embodiment as a mass product.

Another advantage is that largely commercially available switches may be used since no port prioritization is required. As a result, it is possible to use switches that are available on the market (e.g., switches that are not specifically designed for the application). This has a positive influence on the availability and the price. Switches that may currently be used in the automotive sector and in which aspects such as a wide operating temperature range, current consumption, and also price play a role are also available only with a relatively small number of ports. Another aspect is that few of these switches provide support for time-sensitive networks TSN, as specified in IEEE 802.1Qbu or IEEE 802.1Qbv, for example (e.g., support for time-sensitive networks in which long, low-priority data packets may be interrupted for high-priority short data packets).

The problem of port prioritization is to be explained in connection with FIG. 1. If, for example, the third node K3 is operating defectively and sends a plurality of defective packets to the first node K1, the first node K1 does not have any possible way of giving preference to data packets that internally come from the two respective computing units and are compared over the external data packets from the node 3 if the defective packets from K3 have the same prioritization information in the header. In order to switch off this error source, both nodes are to support port-based prioritization or port prioritization (e.g., must prioritize the packets depending on the port at which the packets were received).

In contrast, this is not required in the structure shown in FIG. 2. Since the X-lane data or X-lane traffic (e.g., data that is interchanged between the two computing units inside a node) is communicated only via the internal switch $Sw_i$, an Ethertype, a VLAN ID, and/or a VLAN priority may be used for this data.

The ports that connect the internal switch $Sw_i$ to the external switch $Sw_e$ may be configured such that X-lane data is not forwarded. Therefore, no data packets are interchanged between the internal switch $Sw_i$ and the external switch $Sw_e$ if the data packets have a corresponding attribute that is reserved for data packets that are directed from one computing unit in the node to the other computing unit. The attributes are, for example, header attributes in the data header or "header" (e.g., "VLAN tags" or "Ethertypes"). It is also possible to provide a plurality of connections between the internal switch $Sw_i$ and the external switch $Sw_e$. In order to prevent data from being interchanged, at least either the corresponding internal switch $Sw_i$ does not forward a data packet directed from one computing unit to the other or the corresponding external switch $Sw_e$ rejects this packet at each connection. In order to increase the reliability, provision may also be made for both the internal switch $Sw_i$ and the external switch $Sw_e$ to be configured accordingly.

In addition, the data traffic entering the switch $Sw_i$ from the outside may be limited using simple standard measures. It is therefore possible to provide that, as a result of an external error, so many defective data packets never arrive at a computing unit $CPU_{a,b}$ that the X-lane data may no longer be processed on account of resource bottlenecks (e.g., buffer size or computing time). The X-lane traffic may therefore be reliably prioritized above all other data classes or traffic classes without one of the switches having to support port-based prioritization. For this purpose, the external switch $Sw_e$ may be configured such that data packets are forwarded to the internal switch $Sw_i$ only until a predefined data rate is reached. Alternatively or additionally, the internal switch $Sw_i$ may be configured such that the internal switch $Sw_i$ rejects packets coming from the external switch $Sw_e$ if the predefined data rate is exceeded. The predefined data rate is such that the data traffic between the CPUs is not impaired or is not significantly impaired, which depends, inter alia, on the available computing power and the size of the data buffers in the switch or/and the computing unit. There is only insignificant impairment if the data may still be interchanged in a predefined bandwidth and within a predefined delay.

In the case of a plurality of connections between the internal switch $Sw_i$ and the external switch $Sw_e$, at least one switch is advantageously configured for each connection such that the data traffic may be limited.

This makes it possible to use commercially available switches that are, for example, cost-effective in comparison with field programmable gate arrays (FPGAs). In the architecture according to FIG. 1, prioritization by identifications, tags, or other identifiers adhering to the data frame would not be sufficient since it cannot be excluded that a defectively operating node (e.g., the node K3) generates data frames with this tag.

In the architecture according to FIG. 2, data frames with these tags would be rejected both at the transmitting port and at the receiving port of the line or link connecting the internal switch $Sw_i$ and the external switch $Sw_e$, with the result that the data frames may not interfere with the X-lane traffic. Data that is to be received from the outside may be limited in terms of bandwidth on the same link, with the result that the data is not able to interfere with the X-lane traffic as a result of the receiving buffers or the CPU being overloaded.

Alternatively, a number of greater than or equal to two computing units may be provided inside a node. The computing units may communicate via one or more internal switches $Sw_i$. The probability of a node being switched off may therefore be reduced, for example, if a majority decision is made (e.g., a computing result is recognized as correct as soon as at least two nodes have the same result).

A plurality of interfaces IF may be provided in order to communicate with an assembly in different ways or/and with a plurality of assemblies.

An Ethernet ring may be formed, for example, by a control module having two or more nodes. In this case, an interface to the respective assembly may be provided in one or more nodes. Communication with different assemblies may take place via different interfaces or the same interfaces.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A network node comprising:
   a first computing unit within the network node;
   at least one second computing unit within the network node;
   an internal switch within the network node; and
   an external switch within the network node,
   wherein the internal switch is connected to the first computing unit, the at least one second computing unit, and the external switch,
   wherein the external switch comprises at least one port for data that comes from other network nodes,
   wherein at least one port on the external switch is configured such that a data rate that is forwarded to the internal switch is limited to a predefined data rate, and
   wherein the predefined data rate depends on an available computing time and a buffer size such that data interchange between the first computing unit and the second computing unit is not impaired.

2. The network node of claim 1, further comprising at least one interface for outputting control commands to an assembly.

3. The network node of claim 2, wherein the at least one interface comprises a port of the external switch.

4. The network node of claim 1, wherein the internal switch is configured such that data from at least one computing unit of the first computing unit and the at least one second computing unit is transferred to the internal switch via at least one port of the switch and is transferred to the external switch via at least one other port of the internal switch.

5. The network node of claim 1, wherein the external switch comprises at least one port for communicating with a respective node.

6. The network node of claim 1, wherein the first computing unit and the at least one second computing unit carry out computing operations, and the network node switches off when results of the computing operations differ.

7. The network node of claim 1, wherein at least one port on the internal switch is configured, at a connection that connects the internal switch to the external switch, such that packets that are identified with an attribute that is reserved for packets transporting data from the first computing unit to the second computing unit are not forwarded from the port on the internal switch to the external switch.

8. The network node of claim 1, wherein at least one port on the external switch is configured, at a connection that connects the internal switch to the external switch, such that packets that are identified with an attribute that is reserved for packets transporting data from the first computing unit to the second computing unit are rejected by the external switch.

9. The network node of claim 1, wherein at least one port on the internal switch is configured such that data packets from a port on the external switch are rejected when the predefined data rate is exceeded.

10. A control module for at least one component, the control module comprising:
at least one first node and at least one second node, each node of the at least one first node and the at least one second node comprising:
a first computing unit within the respective node;
at least one second computing unit within the respective node; and
an internal switch within the respective node; and
an external switch within the respective node,
wherein the internal switch is connected to the first computing unit, the at least one second computing unit, and the external switch,
wherein the external switch comprises at least one port for data that comes from other network nodes,
wherein at least one port on the external switch is configured such that a data rate that is forwarded to the internal switch is limited to a predefined data rate, and
wherein the predefined data rate depends on an available computing time and a buffer size such that data interchange between the first computing unit and the second computing unit is not impaired; and
an interface for outputting control data and for receiving data relating to a component to be controlled, in which, when a node of the at least one first node and the at least one second node switches off, another node of the at least one first node and the at least one second node undertakes the tasks of the node.

11. An Ethernet ring comprising:
at least two nodes that form a control module, each node of the at least two nodes comprising:
a first computing unit within the respective node;
at least one second computing unit within the respective node; and
an internal switch within the respective node; and
an external switch within the respective node,
wherein the internal switch is connected to the first computing unit, the at least one second computing unit, and the external switch,
wherein the external switch comprises at least one port for data that comes from other network nodes,
wherein at least one port on the external switch is configured such that a data rate that is forwarded to the internal switch is limited to a predefined data rate, and
wherein the predefined data rate depends on an available computing time and a buffer size such that data interchange between the first computing unit and the second computing unit is not impaired; and
a component that is connected to the control module and is to be controlled by the control module.

12. The Ethernet ring of claim 11, wherein the at least two nodes comprise three nodes that form the control module, two nodes of the three nodes having an interface for communicating with the component.

13. The Ethernet ring of claim 11, wherein the respective node further comprises at least one interface for outputting control commands to an assembly.

14. The Ethernet ring of claim 13, wherein the at least one interface comprises a port of the respective external switch.

15. The Ethernet ring of claim 11, wherein the respective internal switch is configured such that data from at least one computing unit of the first computing unit and the at least one second computing unit of the respective node is transferred to the respective internal switch via at least one port of the switch and is transferred to the respective external switch via at least one other port of the respective internal switch.

16. The Ethernet ring of claim 11, wherein the respective external switch comprises at least one port for communicating with a respective node.

* * * * *